United States Patent
Kim

(10) Patent No.: US 7,336,707 B2
(45) Date of Patent: Feb. 26, 2008

(54) METHOD AND APPARATUS FOR DETECTING IMPROPER AREA FOR MOTION COMPENSATION IN VIDEO SIGNAL

(75) Inventor: Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 837 days.

(21) Appl. No.: 10/456,497

(22) Filed: Jun. 6, 2003

(65) Prior Publication Data

US 2004/0247028 A1    Dec. 9, 2004

(51) Int. Cl.
*H04N 7/12*   (2006.01)
*H04N 11/02*  (2006.01)
*H04N 11/04*  (2006.01)
*H04B 1/66*   (2006.01)

(52) U.S. Cl. ...................................... 375/240
(58) Field of Classification Search ............ None
See application file for complete search history.

(56) References Cited

U.S. PATENT DOCUMENTS

| | | | |
|---|---|---|---|
| 6,418,166 B1* | 7/2002 | Wu et al. | 375/240.12 |
| 6,973,130 B1* | 12/2005 | Wee et al. | 375/240.16 |
| 2002/0025001 A1* | 2/2002 | Ismaeil et al. | 375/240.16 |
| 2003/0122961 A1* | 7/2003 | Li | 348/448 |
| 2004/0081240 A1* | 4/2004 | Chen et al. | 375/240.16 |

\* cited by examiner

*Primary Examiner*—Nhon T. Diep
(74) *Attorney, Agent, or Firm*—Kenneth L. Sherman, Esq.; Michael Zarrabian, Esq.; Myers Dawes Andras & Sherman, LLP

(57) ABSTRACT

A motion compensation method for estimating motion between one image frame and another image frame. Each frame is divided into a number of block, and a match is found for a block of one frame within a search area in another frame. A motion vector is determined that represents the geometrical displacement between the two matched blocks, by determining whether motion estimation is being performed near pattern-like objects in the frames. A new frame is reconstructed by interpolation as a function of the two existing frames based on the motion vector and a degree of being a pattern-like object in a frame.

49 Claims, 13 Drawing Sheets

FIG. 13                    Reconstructed picture

METHOD AND APPARATUS FOR DETECTING IMPROPER AREA FOR MOTION COMPENSATION IN VIDEO SIGNAL

FIELD OF THE INVENTION

The present invention relates generally to video processing, and more particularly to motion compensation.

BACKGROUND OF THE INVENTION

In video processing, typically only some fraction of an image changes from picture frame to picture frame, allowing prediction from previous frames. Motion compensation is used as part of the predictive process. If an image sequence shows moving objects, then their motion within the scene can be measured, and the information used to predict the content of frames later in, or between, the sequence.

In video encoding, motion estimation is applied for the elimination of the temporal redundancy of video material and is therefore a central part of the video coding standards. As such, motion compensation is based on motion estimation for many video processing applications. Examples of motion compensation include video compression such as MPEG-2 and MPEG-4, frame rate conversion, noise reduction, de-interlacing, format conversion, etc. The core function of motion compensation and motion estimation is to find motion between pictures or, equivalently, to find a motion vector.

Many motion estimation methods have been developed. The simplest motion estimation method is a block-matching algorithm, wherein the pixel values in blocks of each frame are estimated by a displaced block of similar shape and size in a past frame. As such, this method finds the best match for a block of a target picture frame within a search area in a reference picture frame. Estimating motion results in a motion vector, which represents the geometrical displacement between the two matched blocks. The motion vector is determined by finding a vector that essentially minimizes a cost function that is a measure of mismatch between the reference and the target blocks.

A major disadvantage of conventional motion estimation methods based on block matching is that in some causes the determined motion vector is incorrect. Incorrect estimation of motion vector may introduce serious visual artifacts depending on application. Examples of such cases include motion estimation for zooming video, rotating objects, fast or large motion, and motion estimation around pattern-like objects.

There is, therefore, a need for a method for detecting pattern-like objects in pictures to enhance the reliability of motion vector estimation. There is also a need for a such a method that allows designation of the degree of reliability of the estimated motion vector.

BRIEF SUMMARY OF THE INVENTION

The present invention addresses the above needs. An object of the present invention is to provide methods to detect pattern-like objects in a picture to enhance the reliability of the motion vector estimated and to also provide hybrid motion estimation. It is a further object of the present invention to provide a method which allows designation of the degree of reliability of the estimated motion vector.

In embodiment, the present invention provides a motion compensation method for estimating motion between one image frame and another image frame. Each frame is divided into a number of block, which can be overlapped or non-overlapped, and a match is found for a block of one frame within a search area in another frame. A motion vector is determined that represents the geometrical displacement between the two matched blocks, by determining whether motion estimation is being performed near pattern-like objects in the frames. A new frame is reconstructed by interpolation as a function of the two existing frames based on the motion vector and a degree of being a pattern-like object in a frame.

BRIEF DESCRIPTION OF THE DRAWINGS

These and other features, aspects and advantages of the present invention will become understood with reference to the following description, appended claims and accompanying figures where:

Like reference characters refer to like elements.

DETAILED DESCRIPTION OF THE INVENTION

Figure 1:
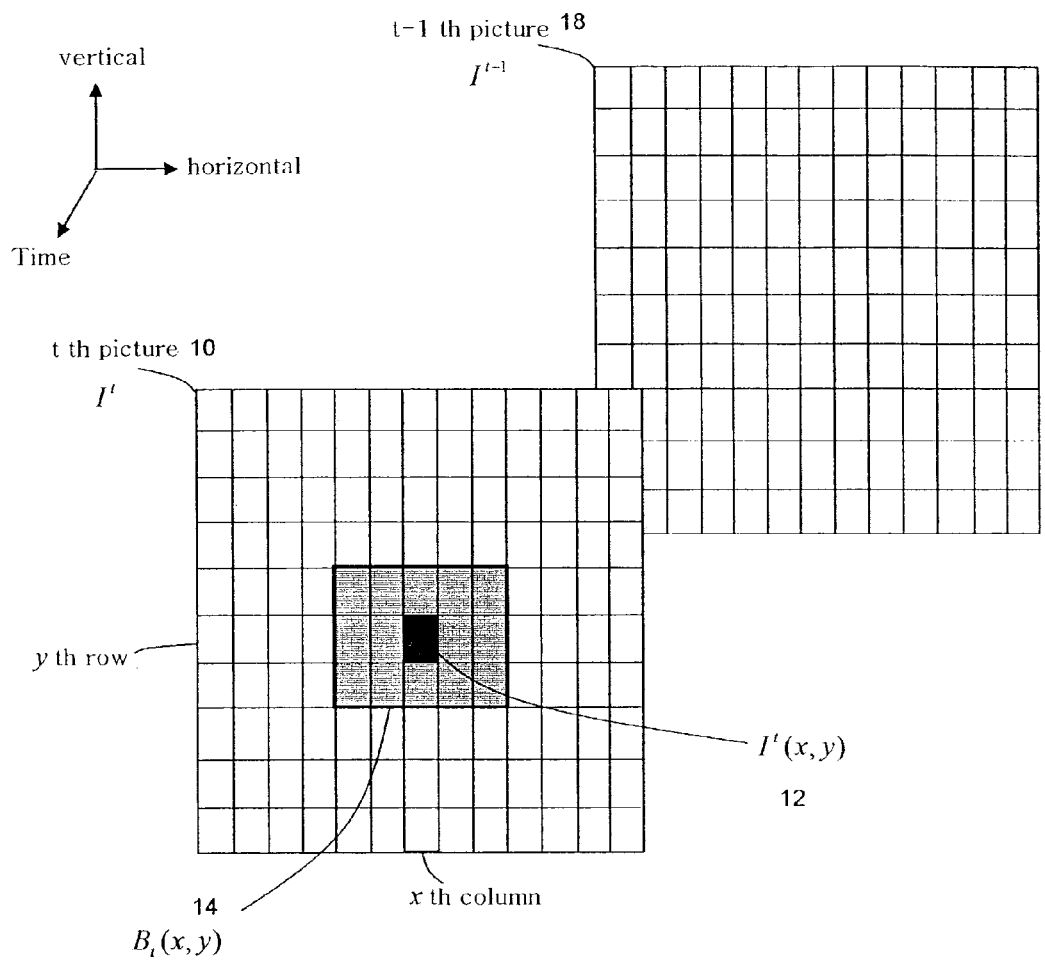
FIG. 1 shows an example diagram of two image frames separated in time.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

As noted above, a block matching method can be used to estimate motion of objects that are depicted in blocks of video image information in video picture frames. An example block matching method finds the best matched block for a block in a target picture/image frame within a search area in a reference picture. Estimating motion, results in a motion vector which represents the geometrical displacement between the two matched blocks. The motion vector is determined by finding a vector that essentially minimizes a cost function that is a measure of the mismatch between the reference and the target blocks. Although it is possible to use different kinds of block shapes (e.g., rectangular, square, circular form, diamond form, etc.), in the description herein rectangular blocks are used for ease of description. In the description herein the words "frame" and "picture" are used as equivalent.

Each image frame is divided into a fixed number of square blocks. For each block in a target frame, a search is made in a reference frame over an area of the image that allows for the maximum translation that the system can use. The search is for the best matching block, to give the least cost error, usually minimizing either mean square difference, mean absolute difference, sum of absolute difference, etc.

Figure 2:
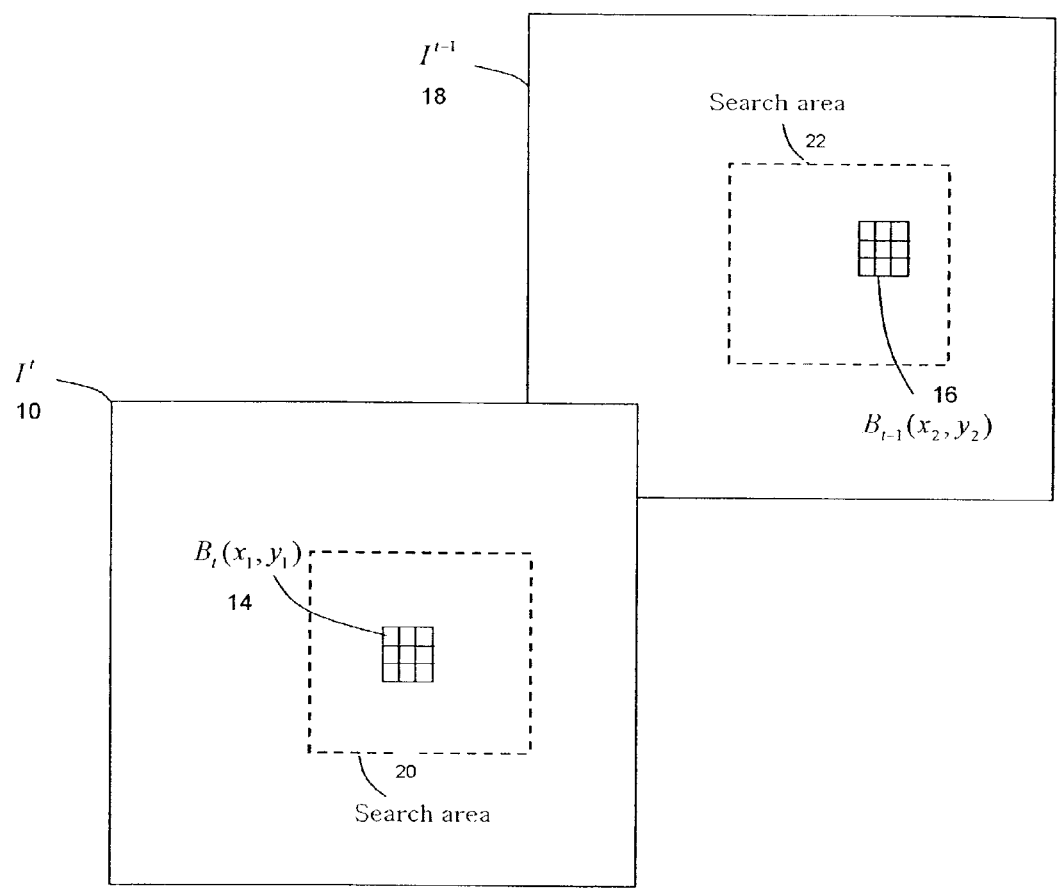
FIG. 2 shows an example diagram of block matching for the image frames of FIG. 1.

With reference to FIG. 1, for the purposes of description herein, at a time t, $I^t$ denotes the $t^{th}$ picture 10, $I^t(x, y)$ denotes values of the pixel 12 at location (x, y) in the picture $I^t$, and $B_t(x, y)$ denotes the location of a block 14 at location (x, y) in the $t^{th}$ picture 10. As shown by example in FIG. 2, generally, matching a block 14 includes the steps of comparing one block 14, $B_t(x_1, y_1)$, in the $t^{th}$ picture 10 (target picture) and another block 16, $B_{t-1}(x_2, y_2)$, in the $t-1^{th}$ picture 18 (reference picture) using a properly defined cost function. Both blocks 14, 16 are within same pre-determined search areas 20, 22 in their respective pictures 10, 18. Then motion vector estimation, involves finding the best matching blocks within the search areas 20, 22. For this purpose, the value of the cost function is computed at several locations in the search area.

In the following, examples of block matching using backward motion estimation, forward motion estimation, and bi-directional motion estimation are provided. A rectangular block 14 (and block 16) is assumed for simplicity of descriptions, wherein the block comprises N×M pixels 12. The present invention is also applicable to other block shapes, as noted above.

Figure 3:
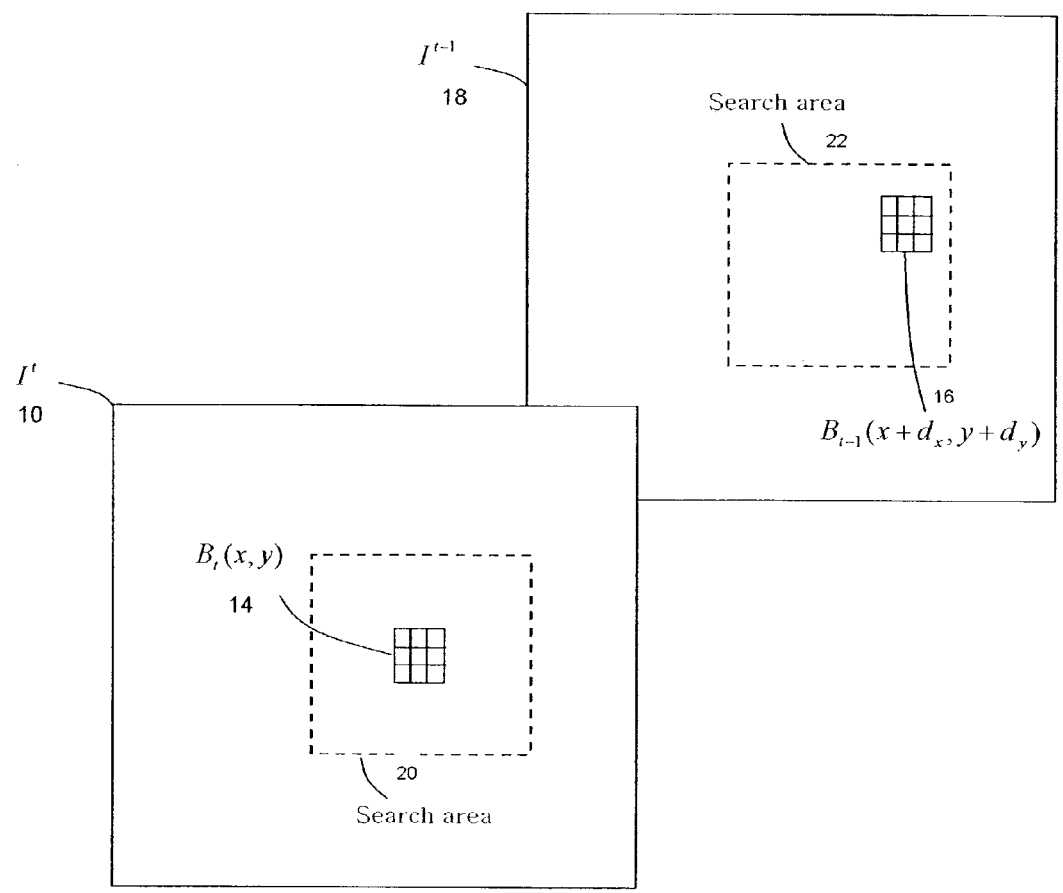
FIG. 3 shows an example block matching diagram for forward motion estimation.

FIG. 3 shows an example block matching method for backward motion estimation in which the $B_t(x, y)$ block 14 in the $I^t$ picture 10 is compared with the, $B_{t-1}(x+d_x, y+d_y)$ block 16, in $I^{t-1}$ picture 18, wherein $(d_x, d_y)$ represent the search locations satisfying the relation $(d_x, d_y) \in \{(p,q) | p=-D_x, \ldots, 0, \ldots, D_x$ and $q=-D_y, \ldots, 0, \ldots, D_y\}$, and wherein $D_x$, and $D_y$ are the parameters associated with the search areas 20, 22.

The $B_t(x, y)$ and $B_{t-1}(x+d_x, y+d_y)$ blocks 14, 16 are displaced by the vector$(d_x, d_y)$. Although any cost function can be used for motion estimation, in this example, the sum of absolute difference ("SAD") is used. As such, a block difference signal is defined as:

$$D(d_x, d_y) = B_t(x, y) - B_{t-1}(x+d_x, y+d_y) \tag{1}$$

wherein:

$$D(d_x, d_y) = \begin{bmatrix} D_{1,1} & D_{1,2} & \cdots & D_{1,M} \\ D_{2,1} & D_{2,2} & \cdots & D_{2,M} \\ \vdots & \vdots & & \vdots \\ D_{N,1} & D_{N,1} & \cdots & D_{N,M} \end{bmatrix}.$$

Then the SAD can be expressed as:

$$SAD(d_x, d_y) = \|D(x, y)\| \tag{2a}$$

$$= \sum_{i=1}^{N} \sum_{j=1}^{M} |D_{i,j}|$$

or alternatively, $$SAD(d_x, d_y) = \left| \sum_{i=1}^{N} \sum_{j=1}^{M} D_{i,j} \right| \tag{2b}$$

As discussed, motion estimation involves determining a motion vector $(v_x, v_y)$ which provides the minimum SAD. The motion vector $(v_x, v_y)$ can be determined as one which satisfies the condition $SAD(v_x, v_y) \leq SAD(d_x, d_y)$, for all or some possible search locations of $(d_x, d_y)$ in the search range (area). If a full search range is considered for the motion estimation, then the motion vector $(v_x, v_y)$ is one which satisfies the condition $SAD(v_x, v_y) \leq SAD(d_x, d_y)$, for all $(d_x, d_y) \in R$, where $R=\{(p,q) | p=-D_x, \ldots, 0, \ldots, D_x$ and $q=-D_y, \ldots, 0, \ldots, D_y\}$ which represents the set of search locations (i.e., searching area/range).

Figure 4:
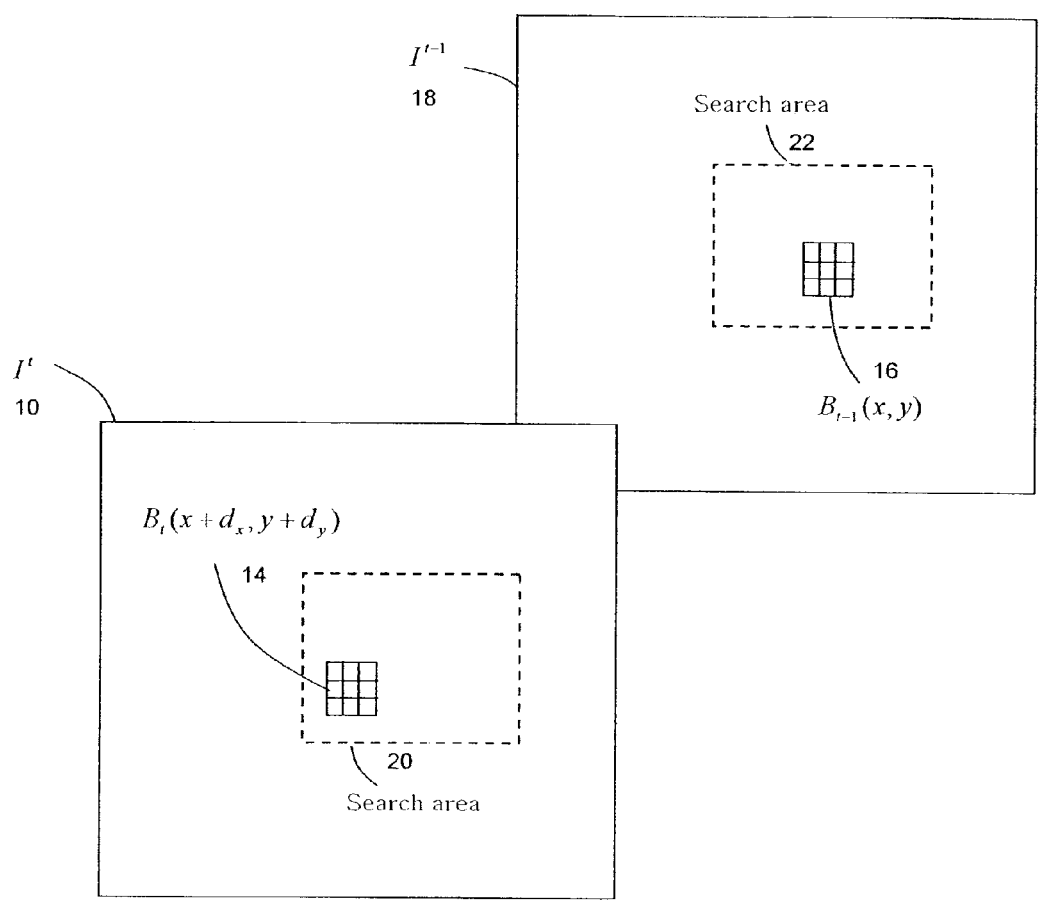
FIG. 4 shows an example block matching diagram for backward motion estimation.

Forward motion estimation is analogous to backward motion estimation. FIG. 4 shows an example block matching method for forward motion estimation in which the $B_{t-1}(x, y)$ block 16 in the $I^{t-1}$ picture 18 is compared with $B_t(x+d_x, y+d_y)$ block 14 in the $I^t$ picture 10. The $B_{t-1}(x, y)$ and $B_t(x+d_x, y+d_y)$ blocks 16, 14 are displaced by the vector$(d_x, d_y)$. The block difference signal $D(d_x, d_y)$ for forward motion estimation can be defined as:

$$D(d_x, d_y) = B_{t-1}(x, y) - B_t(x+d_x, y+d_y) \tag{3}$$

and the SAD for forward motion estimation can be expressed as:

$$SAD(d_x, d_y) = \|D(x, y)\| \tag{4}$$

$$= \sum_{i=1}^{N} \sum_{j=1}^{M} |D_{i,j}|$$

wherein $D_{ij}$ is the $(i, j)^{th}$ element of $D(d_x, d_y)$ defined above.

Forward motion estimation involves determining a motion vector $(v_x, v_y)$ which provides the minimum SAD. The motion vector $(v_x, v_y)$ can be determined as one which satisfies the condition $SAD(v_x, v_y) \leq SAD(d_x, d_y)$, for all or some possible search locations of $(d_x, d_y)$ in the search range. If a full search range is considered for the motion estimation, the motion vector is the one which satisfies the condition $SAD(v_x, v_y) \leq SAD(d_x, d_y)$, for all $(d_x, d_y) \in R$.

Figure 5:
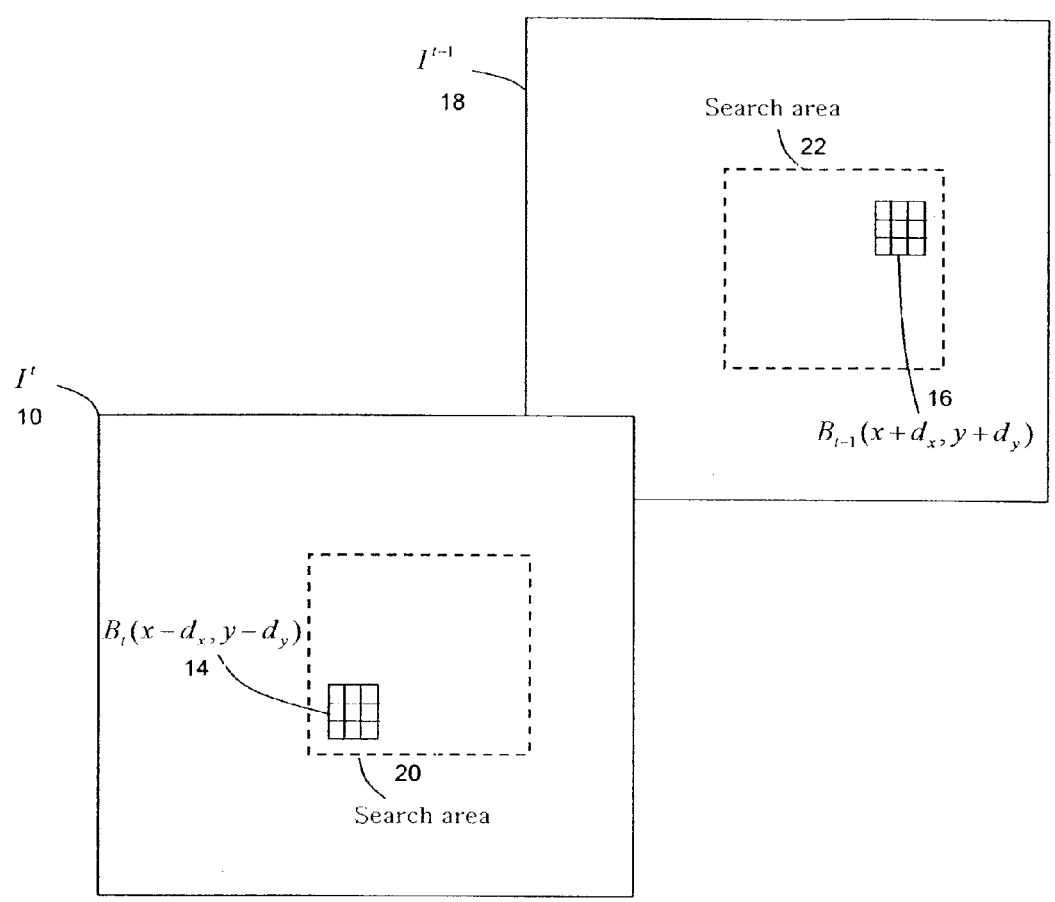
FIG. 5 shows an example block matching diagram for bidirectional motion estimation.

Bi-directional motion estimation is a useful for frame interpolation based on motion estimation. This method is similar to that in forward and backward motion estimation, except that locations of the blocks to be compared are geometrically symmetrical with respect to (x, y). FIG. 5 shows an example block matching method for bi-directional motion estimation. The $B_t(x-d_x, y-d_y)$ block 14 in the $I^t$ picture 10 is compared with the $B_{t-1}(x+d_x, y+d_y)$ block 16 in the $I^{t-1}$ picture 18. The $B_t(x-d_x, y-d_y)$ and $B_{t-1}(x+d_x, y+d_y)$ blocks 14, 16 are displaced by the vector($2 \cdot d_x$, $2 \cdot d_y$). The block difference signal $D(d_x, d_y)$ is defines as:

$$D(d_x, d_y) = B_t(x-d_x, y-d_y) - B_{t-1}(x+d_x, y+d_y) \quad (5)$$

and the SAD for the bi-directional motion estimation can be expressed as:

$$SAD(d_x, d_y) = \|D(x, y)\| \quad (6)$$
$$= \sum_{i=1}^{N} \sum_{j=1}^{M} |D_{i,j}|$$

The bi-directional motion estimation involves finding a motion vector $(v_x, y_y)$ which provides the minimum SAD. As such, the motion vector $(v_x, v_y)$ is determined as one which satisfies the condition $SAD(v_x, v_y) \leq SAD(d_x, d_y)$, for all or some possible search locations of $(d_x, d_y)$ in the search range. If a full search range is considered for the motion estimation, the motion vector is one which satisfies the condition $SAD(v_x, v_y) \leq SAD(d_x, d_y)$, for all $(d_x, d_y) \in R$.

In the above examples, regardless of the type of motion estimation used (i.e., backward, forward, bi-directional, etc.), the same form of SAD is used as indicated by equations (2), (4), and (6). If a full search range is used, the SAD in those equations can be represented as a 2-D function with variables $d_x$ and $d_y$, and an associated domain of $(d_x, d_y) \in R$. Then motion estimation (motion vector determination) involves determining a vector $(v_x, v_y)$ for which the SAD has the minimum value.

Figure 6:
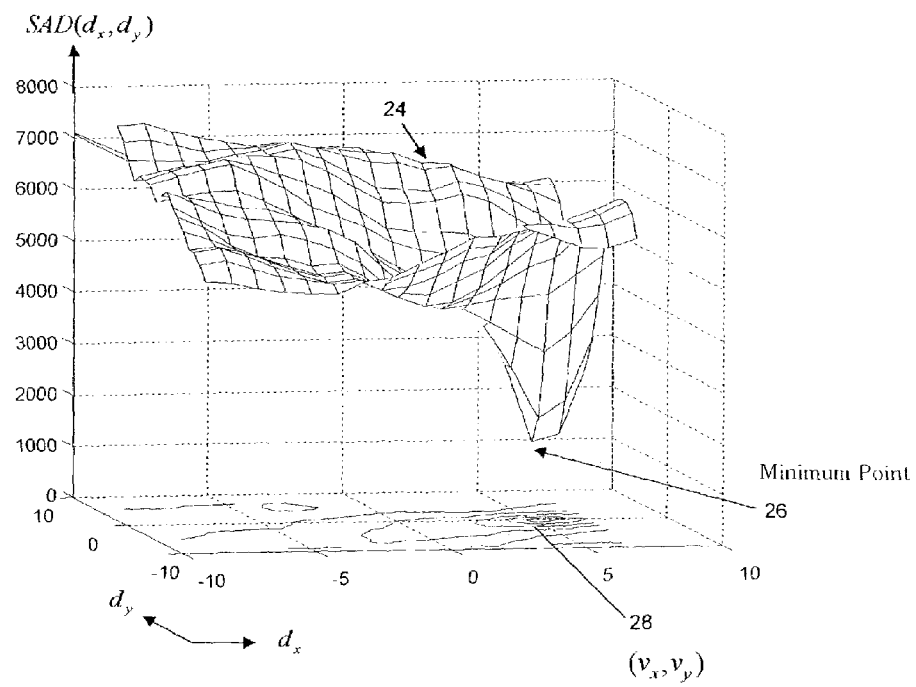
FIG. 6 shows an example sum of absolute difference ("SAD") plot.
Figure 7:
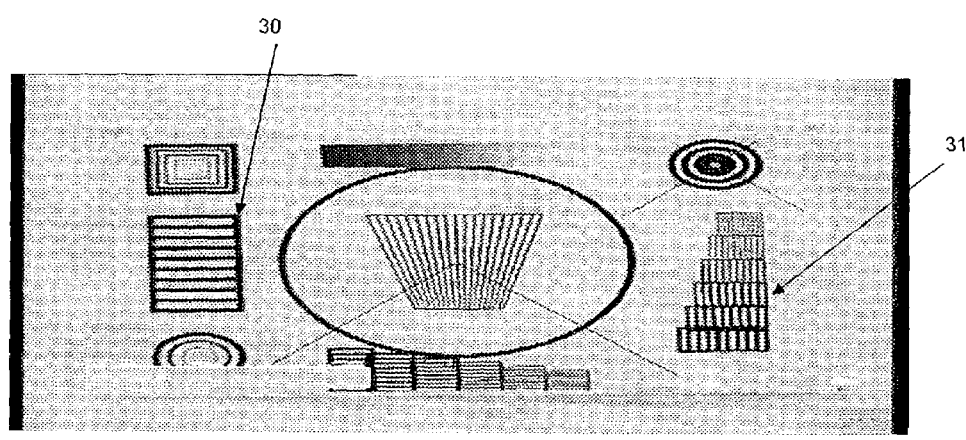
FIG. 7 shows an example picture including pattern-like objects.
Figure 8:
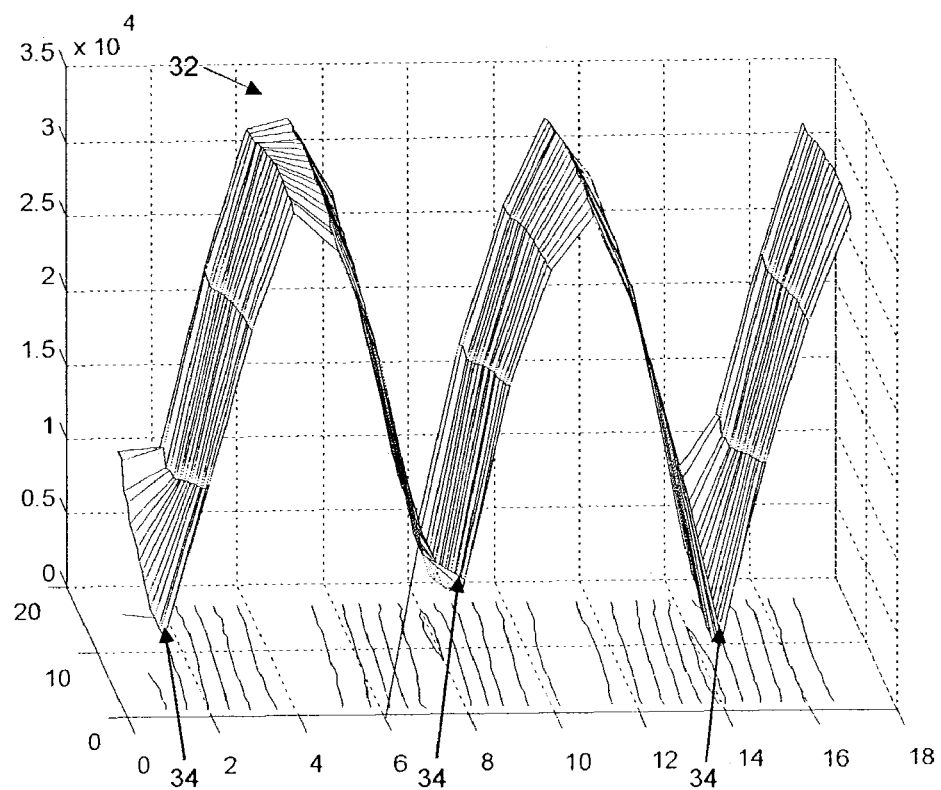
FIG. 8 shows an example SAD plot for the picture of FIG. 7.

FIG. 6 illustrates an example of the plot 24 of SADs showing a minimum point 26 and the associated motion vector 28, $(v_x, v_y)$. As noted above, a shortcoming of conventional motion estimation methods is that in some cases the determined motion vector is inaccurate or ambiguous. An incorrect estimation of motion vector may introduce serious visual artifacts depending on application. Examples of such cases include motion estimation for zooming video, rotating objects, fast or large motion, and around pattern-like objects. An example of a picture containing pattern-like objects 30, 31 is shown in FIG. 7. FIG. 8 shows a SAD plot 32 at a location around the vertical bars 31 in FIG. 7. It can be easily noted that finding the minimum point in the plot 32 of FIG. 8 can be ambiguous because there are multiple local minimums 34 which are close to each other. Hence, finding the correct motion vector is ambiguous. Determining the motion vector by simply finding the minimum point in this example, results in unwanted visual artifacts. In FIG. 8, the axis represent the same concepts as those in FIG. 6.

As such, in one embodiment, the present invention provides a method to detect pattern-like objects in a picture, and use that information to enhance the reliability of motion vector estimation, providing hybrid motion estimation. In another aspect, the present invention provides methods which allow designation of the degree of reliability of the estimated motion vector.

Figure 9:
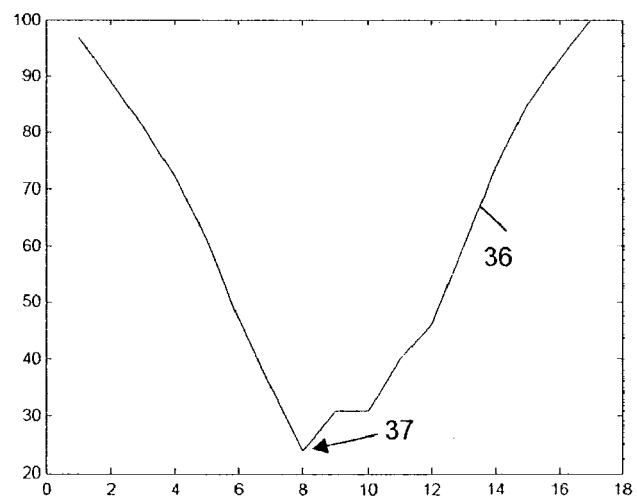
FIG. 9 shows an example SAD plot with one local minimum.
Figure 10:
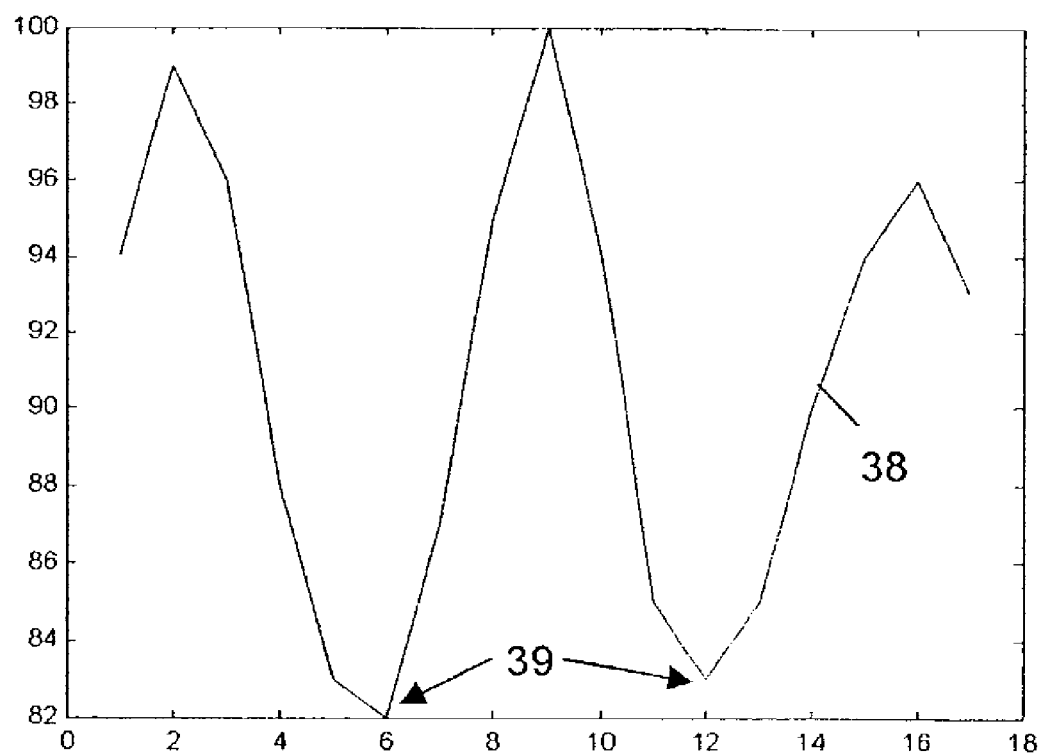
FIG. 10 shows an example SAD plot with multiple minima.
Figure 11:
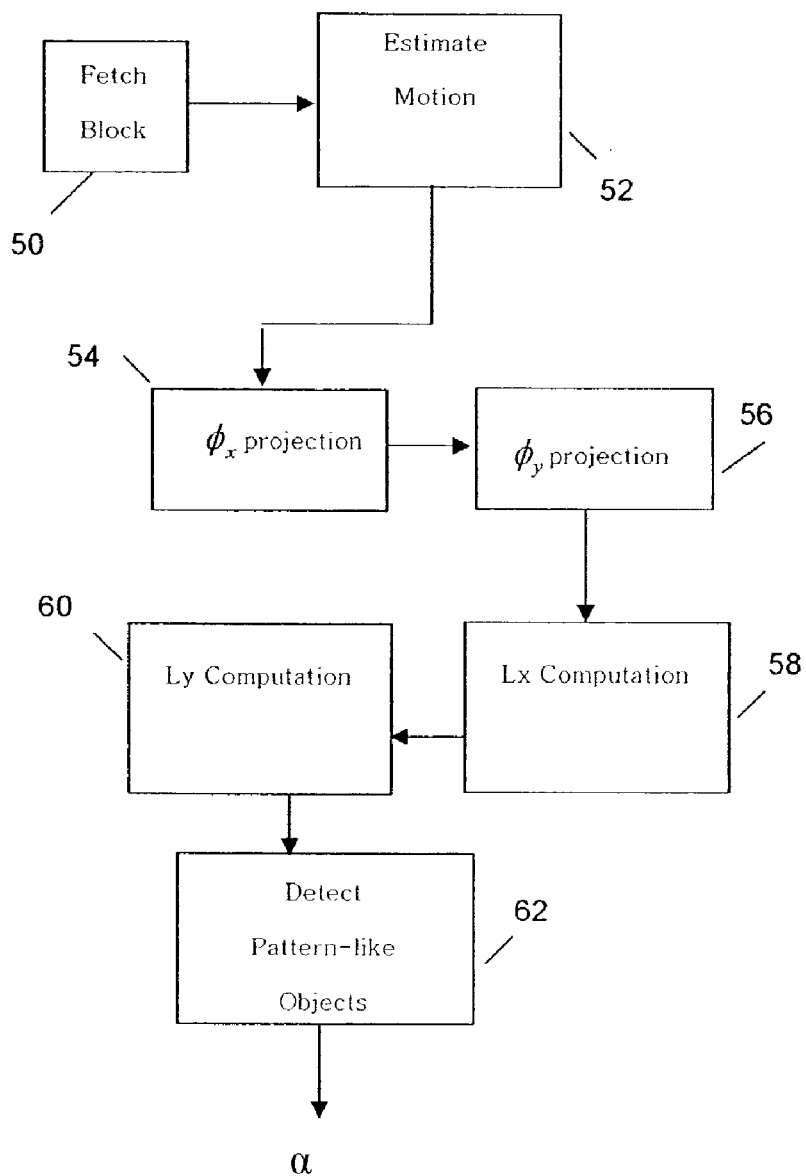
FIG. 11 shows an example method of motion estimation according to an embodiment of the present invention.

Referring to examples in FIGS. 9-10 in conjunction with FIG. 11, an embodiment of a method of detecting pattern-like objects in a picture, according to the present invention, is now described. Referring to FIG. 11, the method includes the steps of: receiving frames of picture information, including said pictures $I^t$ and $I^{t-1}$ wherein the picture information is accessed and cached in units of blocks (e.g., a small rectangular region appropriate for efficient fetching and catching) with block fetching from a memory (step 50); performing motion estimation by block matching (e.g., backward, forward, bi-directional motion estimation, etc.), to determine SAD values for the blocks (step 52); and detecting pattern-like objects in a picture by generating horizontal and vertical projection functions $\phi_x$ and $\phi_y$, respectively (steps 54, 56), wherein in one example, the horizontal projection function $\phi_x$ is defines as:

$$\phi_x(d_x) = \sum_{q=-D_y}^{D_y} SAD(d_x, q), d_x = -D_x, \ldots, 0, \ldots, D_x \quad (7)$$

and the vertical projection function $\phi_y$ is defined as:

$$\phi_y(d_y) = \sum_{p=-D_x}^{D_x} SAD(p, d_y), d_y = -D_y, \ldots, 0, \ldots, D_y. \quad (8)$$

Example plots of the horizontal projection function $\phi_x$ are shown in FIGS. 9-10. The example plot 36 in FIG. 9 includes only one local minimum 37, which does not cause ambiguity in determining the associated motion vector. However, the example plot 38 in FIG. 10 includes multiple minima 39 comparable to one another, causing ambiguity in determining the correct motion vector using convention methods. In FIGS. 9 and 10, the horizontal axis represents $d_x$ and the vertical axis represents SAD.

To address the ambiguity problem, according to an aspect the present invention, the shapes of the projection functions $\phi_x$ and $\phi_y$ are examined to determine whether motion estimation is being performed near pattern-like objects. To detect the pattern-like objects, the projection functions are used to compute values $L_x$ and $L_y$ (steps 58, 60 in FIG. 11), representing the "lengths" of the projection functions $\phi_x$ and $\phi_y$, respectively, wherein:

$$L_x = \sum_{d_x=-D_x+1}^{D_x} |\phi(d_x) - \phi(d_x - 1)| \text{ and} \quad (9)$$

$$L_y = \sum_{d_y=-D_y+1}^{D_y} |\phi(d_y) - \phi(d_y - 1)|. \quad (10)$$

As the value of $L_x$ increases, it is more probable that the horizontal projection function $\phi_x$ has multiple minima, and as the value of $L_y$ increases, it is more probable that the vertical projection function $\phi_y$ has multiple minima. Hence, to estimate the overall multiple minima in the SAD (e.g., SAD plot 38 in FIG. 10), a quantity $L_{max}$ is determined as:

$$L_{max} = \max(L_x, L_y) \quad (11)$$

wherein as the value of $L_{max}$ increases, it is more likely that the SAD may have multiple minima.

Then, a value α is computed (step 62 in FIG. 11), wherein α indicates the degree of being a pattern-like object in a picture, wherein:

$$\alpha = \min(1.0, L_{max}/K) \tag{12}$$

where K is a pre-determined constant, based on $D_x$ and $D_y$.

Figure 12:
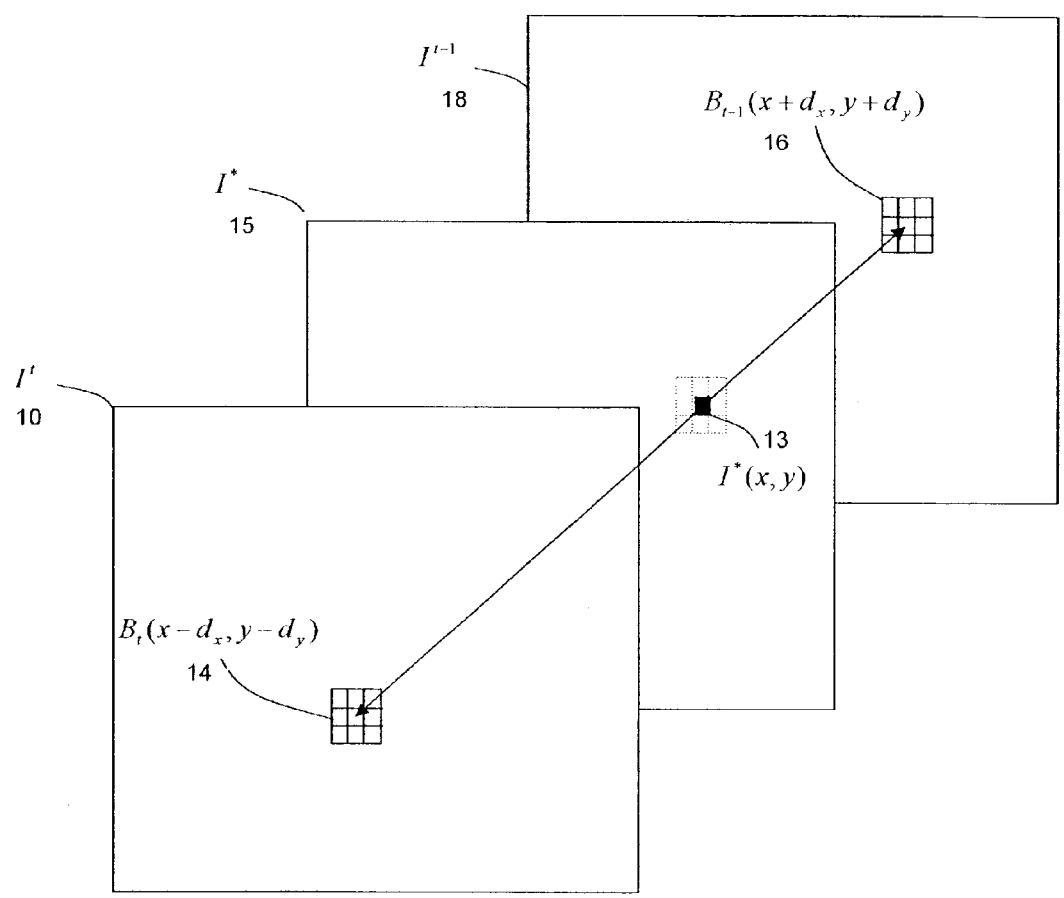
FIG. 12 shows an example diagram of interpolation for picture reconstruction according to an embodiment of the present invention.

The factor value α can be used in picture reconstruction according to another aspect of the present invention. In one example application of motion estimation, an interpolation-based motion estimation (i.e., motion compensation) technique according to the present invention, is utilized. In this example, it is necessary to convert a 50 Hz video sequence to a 60 Hz video sequence, where motion compensation is very useful because a reliable algorithm can produce smooth motion. Referring to the example in FIG. 12, generally, the problem involves reconstructing (e.g., interpolating) a I* picture 15 based on the $I^t$ and $I^{t-1}$ pictures 10, 18, wherein the $I^t$ and $I^{t-1}$ pictures 10, 19, are the $i^{th}$ and $i-1^{th}$ pictures, respectively, and the to-be-reconstructed picture 15, I*, is sequentially in between the $I^t$ and $I^{t-1}$ pictures 10, 18.

With the aforementioned description of the notion behind the motions between the $I^t$ and $I^{t-1}$ pictures 10, 18, in one example, the reconstruction of the I* picture 15 can be expressed by interpolating I*(x, y) pixels 13 based on the above estimated bi-directional motion vectors as:

$$I^*(x, y) = k \cdot I^{t-1}(x+v_x, y+v_y) + (1-k) \cdot I^t(x-v_x, y-v_y),$$

for all values of x and y, wherein in this example k is a pre-determined constant between 0 and 1, associated with the relative location of the I* picture 15 in time.

Figure 13:
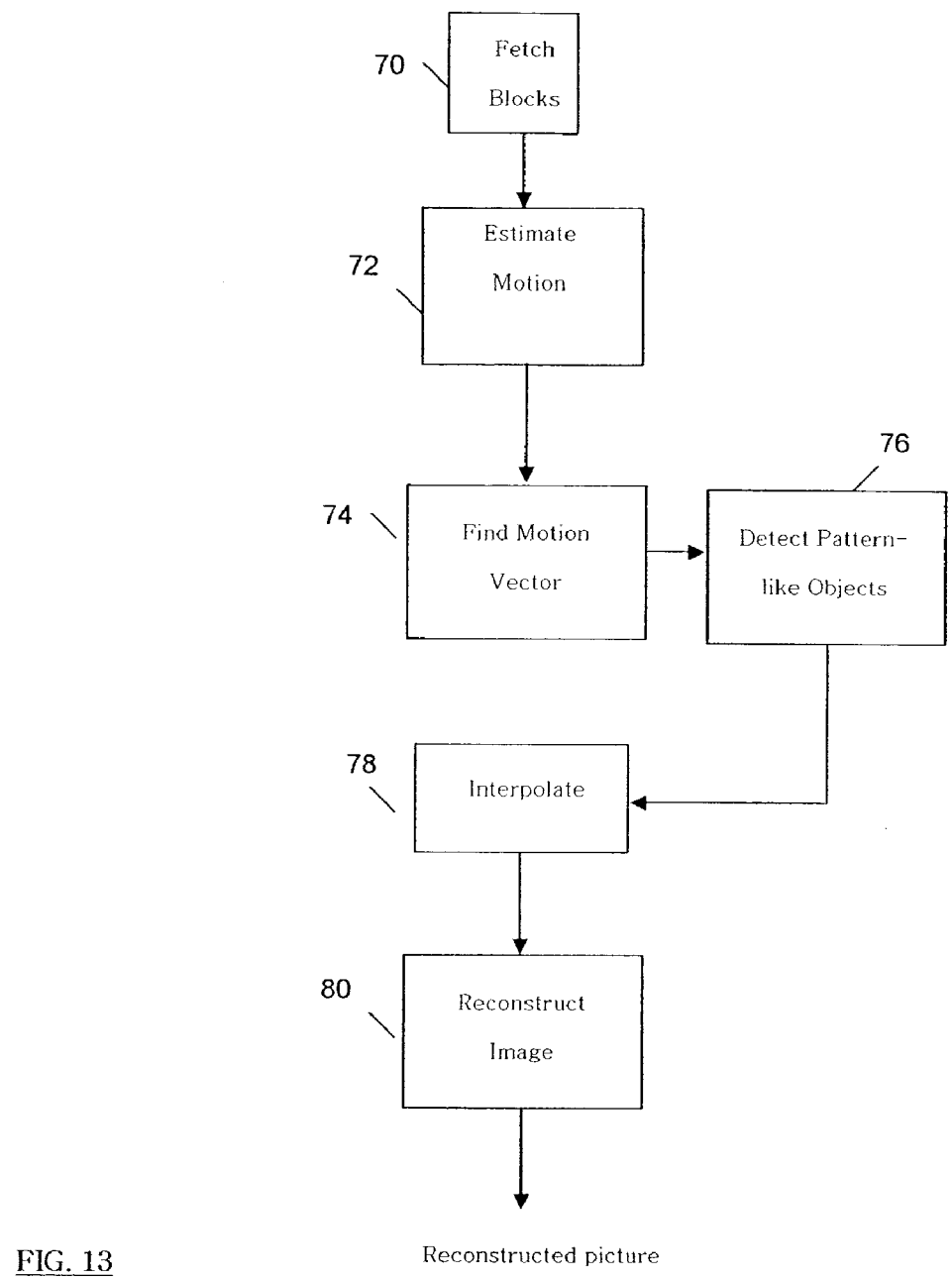
FIG. 13 shows an example method of interpolation for picture reconstruction according to an embodiment of the present invention.

Referring to the example in FIG. 13, combining the above reconstruction method with the aforementioned method of detecting the pattern-like objects, the present invention further provides an example reconstruction of the I* picture 15, including the steps of: receiving frames of picture information, including said pictures $I^t$ and $I^{t-1}$, wherein the picture information is accessed and cached in units of blocks (e.g., a small rectangular region appropriate for efficient fetching and catching) by performing block fetching (step 70); performing block matching motion estimation to determine SAD($d_x$, $d_y$) values for the blocks (step 72); determining a motion vector ($v_x$, $v_y$) based on the SAD($d_x$, $d_y$) values (step 74); detecting pattern-like objects in the pictures and generating the factor α (step 76); and interpolating I*(x, y) pixels 13 using the motion vector ($v_x$, $v_y$), the factor α, and the $I^t$ and $I^{t-1}$ pictures 10, 18 to determine the I* picture 15, according to the example equation (13) below (step 78), wherein:

$$I^*(x, y) = \alpha \cdot I_v + (1-\alpha) \cdot I_0 \tag{13}$$

where $$I_v = k \cdot I^{t-1}(x+v_x, y+v_y) + (1-k) \cdot I^t(x-v_x, y-v_y)$$

and $$I_0 = k \cdot I^{t-1}(x, y) + (1-k) \cdot I^t(x, y).$$

In equation (13), when α=1 (i.e., when a pattern-like object is detected), the I*(x, y) pixel value 13 becomes $I_0$ wherein $I_0$ is the average of the pixels (samples) 12 in the $I^t$ and $I^{t-1}$ pictures 10, 18 at the same geometrical location. The I* picture 15 is so reconstructed based on interpolated I*(x, y) values 13 (step 80).

Figure 14:
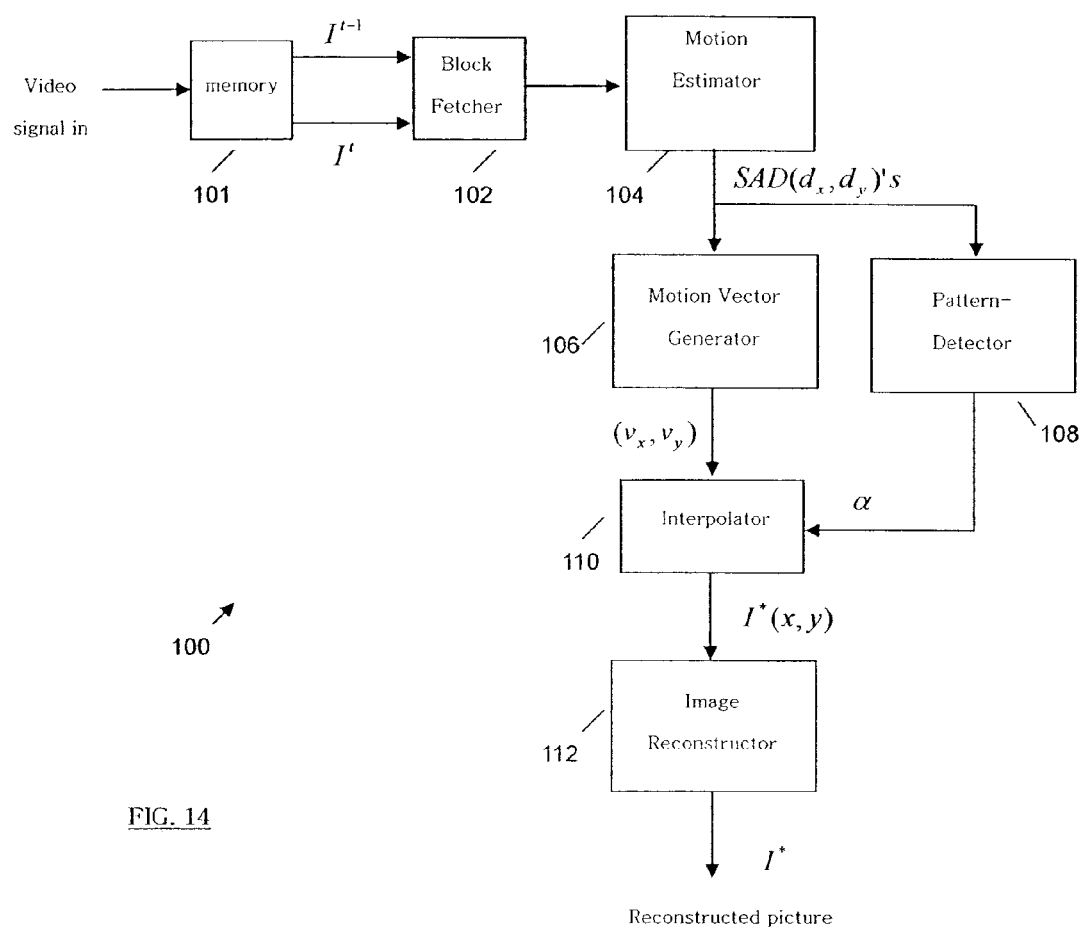
FIG. 14 shows an example architecture block diagram of a motion compensation apparatus according to an embodiment of the present invention.

FIG. 14 shows an example block diagram of an embodiment of a motion compensation apparatus 100 for an encoding device, implementing the present invention as described. The apparatus 100 comprises: a memory buffer 101 for receiving frames of picture information, including said pictures $I^t$ and $I^{t-1}$; a block fetcher 102 that accesses and caches the frames in units of blocks; a motion estimator 104 that performs block matching to determine said SAD($d_x$, $d_y$) values for the blocks, as above; a motion vector generator 106 that determines said motion vector ($v_x$, $v_y$) based on the SAD($d_x$, $d_y$) values per equation (5); a pattern detector 108 that detects pattern-like objects in the pictures and generates the factor α per equation (12); an interpolator 110 that interpolates pixel values 13, I*(x, y), using the motion vector ($v_x$, $v_y$), the factor α, and the pictures $I^t$ and $I^{t-1}$ per equation (13); and a re-constructor 112 that reconstructs the I* picture 15 based on the interpolated pixel values I*(x, y), as described.

Figure 15:
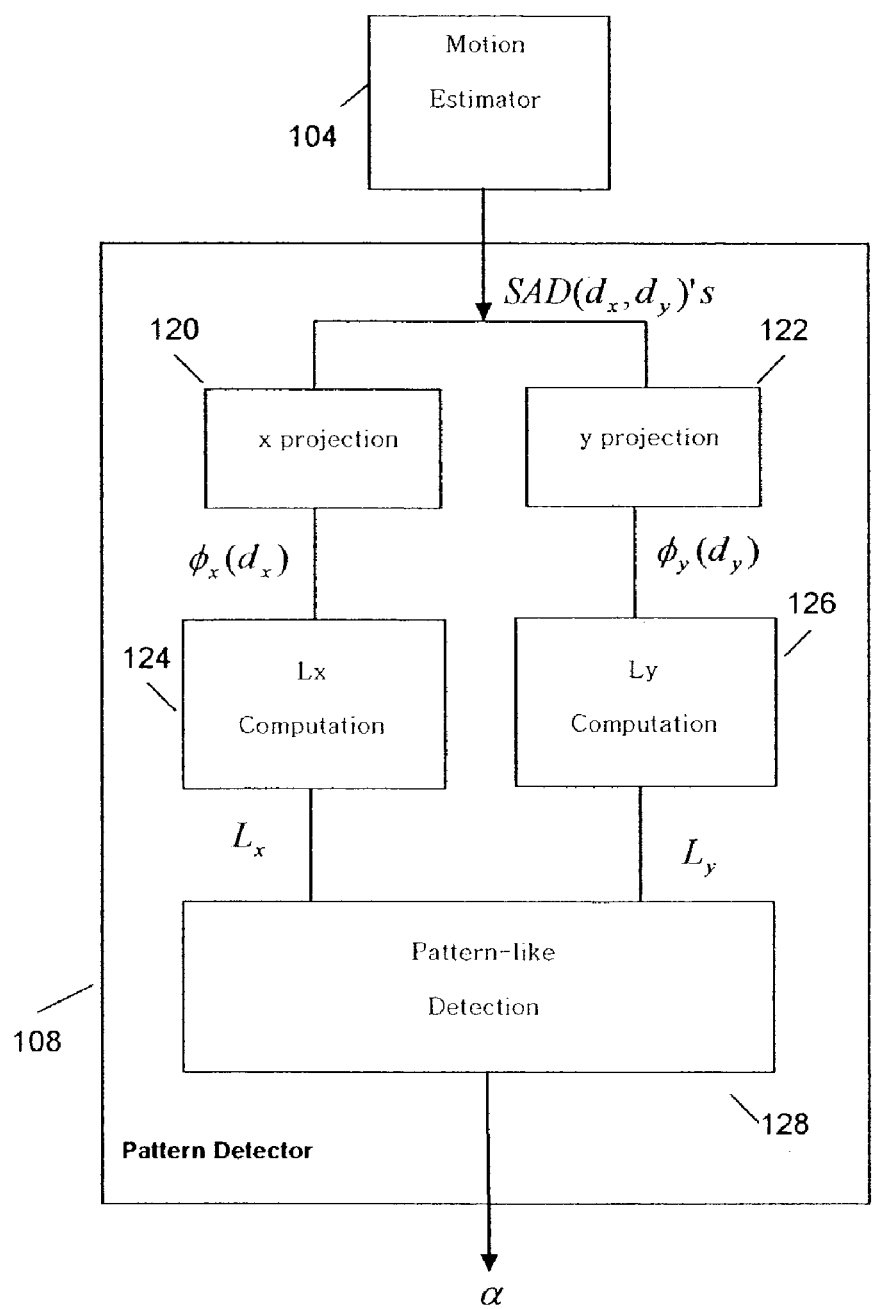
FIG. 15 shows an example architecture block diagram of a pattern detector of FIG. 14 according to an embodiment of the present invention.

FIG. 15 shows an example block diagram of an embodiment of the pattern detector 108 of FIG. 14. The pattern detector 108 comprises: an X Projection block 120 and a Y projection block 122, for receiving the SAD values from the motion estimator 104 and generating said horizontal and vertical projection values $\phi_x$ and $\phi_y$, per equations (7) and (8) respectively; a first length computation block 124 and a second length computation block 126, for determining said values $L_x$ and $L_y$, per equations (9) and (10) respectively, and a pattern-like detection block 128 that determines said factor α per equations (11) and (12).

The various components of the arrangements in FIGS. 14 and 15 can be implemented in many ways known to those skilled in the art, such as for example, as program instructions for execution by a processor, as logic circuits such as ASIC, etc.

As such, the present invention provides an improved method and apparatus for detecting pattern-like objects in pictures to enhance the reliability of motion vector estimation.

The present invention has been described in considerable detail with reference to certain preferred versions thereof; however, other versions are possible. Therefore, the spirit and scope of the appended claims should not be limited to the description of the preferred versions contained herein

What is claimed is:

1. A motion compensation method for estimating a motion between two image frames, comprising the steps of:
   dividing each of the two frames into a number of blocks;
   finding a second block, which is a match of a first block in one of the two frames, within a search area in the other one of the two frames; and
   determining a motion vector representing a geometrical displacement between the first and second blocks, by determining whether the motion estimation is being performed near pattern-like objects in the two frames.

2. The method of claim 1, wherein the step of finding a match further includes the steps of:
   for each block in one of the two frames, searching the other one of the two frames over a search area for a matching block with low error.

3. The method of claim 2, wherein:
   at a time t, $I^t$ denotes a $t^{th}$ frame, $I^t(x, y)$ denotes a pixel value at location (x, y) in $I^t$, and $B_t(x, y)$ denotes a block at location (x, y) in $I^t$; and
   the steps of finding a match further include the steps of comparing one block $B_t(x_1, y_1)$ in $I^t$ and another block $B_{t-1}(x_2, y_2)$ in $I^{t-1}$ using a cost function that is a measure of a mismatch between the two matched blocks.

4. The method of claim 3, wherein:
   (a) the steps of finding a match further include the steps of:
      comparing the block $B_t(x, y)$ in the frame $I^t$ with a block $B_{t-1}(x+d_x, y+d_y)$ in the frame $I^{t-1}$, wherein the blocks $B_t(x, y)$ and $B_{t-1}(x+d_x, y+d_y)$ are displaced by a vector ($d_x$, $d_y$), and ($d_x$, $d_y$) represents search locations satisfying ($d_x$, $d_y$) ∈ {(p,q)|p=−$D_x$, . . . ,0, . . . , $D_x$ and $q=-D_y,, \ldots, 0, \ldots, D_y\}$, such that $D_x$ and $D_y$ are difference signals associated with the search area;

said cost function comprising a sum of absolute difference (SAD) function;

$$SAD(d_x, d_y) = \|D(x, y)\| = \sum_{i=1}^{N} \sum_{j=1}^{M} |D_{i,j}|,$$

for a block of N×M pixels;
where:

$$D(d_x, d_y) = B_t(x, y) - B_{t-1}(x+d_x, y+d_y);$$

$$D(d_x, d_y) = \begin{bmatrix} D_{1,1} & D_{1,2} & \cdots & D_{1,M} \\ D_{2,1} & D_{2,2} & \cdots & D_{2,M} \\ \vdots & \vdots & & \vdots \\ D_{N,1} & D_{N,1} & \cdots & D_{N,M} \end{bmatrix}; \text{ and}$$

(b) the steps of determining said motion vector further include the steps of determining a motion vector $(v_x, v_y)$ that provides the minimum SAD, wherein the motion vector $(v_x, v_y)$ satisfies the condition $SAD(v_x, v_y) \leq SAD(d_x, d_y)$, for one or more search locations of $(d_x, d_y)$ in a search range.

5. The method of claim 4, wherein for a full search range, the motion vector $(v_x, v_y)$ is one that satisfies the condition $SAD(v_x, v_y) \leq SAD(d_x, d_y)$ for all $(d_x, d_y) \in R$, wherein $R = \{(p,q) | p = -D_x,, \ldots, 0, \ldots, D_x \text{ and } q = -D_y,, \ldots, 0, \ldots, D_y\}$, which represents a set of search locations.

6. The method of claim 4, wherein the steps of determining whether the motion estimation is being performed near pattern-like objects in the frames comprise the steps of:

detecting pattern-like objects in a frame utilizing horizontal and vertical projection functions $\phi_x$ and $\phi_y$, respectively, wherein:

$$\phi_x(d_x) = \sum_{q=-D_y}^{D_y} SAD(d_x, q), d_x = -D_x, \ldots, 0, \ldots, D_x, \text{ and}$$

$$\phi_y(d_y) = \sum_{p=-D_x}^{D_x} SAD(p, d_y), d_y = -D_y, \ldots, 0, \ldots, D_y.$$

7. The method of claim 6, wherein the steps of detecting pattern-like objects further include the steps of:

(a) determining values $L_x$ and $L_y$, wherein:

$$L_x = \sum_{d_x=-D_x+1}^{D_x} |\phi(d_x) - \phi(d_x - 1)|, \text{ and}$$

$$L_y = \sum_{d_y=-D_y+1}^{D_y} |\phi(d_y) - \phi(d_y - 1)|;$$

such that as $L_x$ increases, it is more probable that the horizontal projection function $\phi_x$ has multiple minima, and as $L_y$ increases, it is more probable that the vertical projection function $\phi_y$ has multiple minima; and (b) estimating an overall minima $L_{max}$ in the SAD, as:

$$L_{max} = \max(l_x, L_y),$$

wherein as $L_{max}$ increases, it is more likely that the SAD may have multiple minima, indicating a pattern-like object in the frame.

8. The method of claim 7, wherein the steps of detecting pattern-like objects further include the steps of:

determining a value α that indicates a degree of having a pattern-like object in a frame, wherein:

$$\alpha = \min(1.0, L_{max}/K),$$

where K is a pre-determined constant.

9. The method of claim 3, wherein:

(a) the steps of finding a match further include the steps of comparing a block $B_{t-1}(x, y)$ in the frame $I^{t-1}$ to a block $B_t(x+d_x, y+d_y)$ in the frame $I^t$, such that the blocks $B_{t-1}(x, y)$ and $B_t(x+d_x, y+d_y)$ are displaced by the vector $(d_x, d_y)$; where a block difference signal $D(d_x, d_y)$ is expressed as:

$$D(d_x, d_y) = B_{t-1}(x, y) - B_t(x+d_x, y+d_y), \text{ and}$$

said cost function is expressed as:

$$SAD(d_x, d_y) = \|D(x, y)\| = \sum_{i=1}^{N} \sum_{j=1}^{M} |D_{i,j}|$$

(b) the steps of determining said motion vector include the steps of determining a motion vector $(v_x, v_y)$ that provides the minimum SAD, and is determined as one that satisfies the condition $SAD(v_x, v_y) \leq SAD(d_x, d_y)$, for one or more search locations of $(d_x, d_y)$ in the search range.

10. The method of claim 9, wherein for a full search range in the motion estimation, the motion vector $(v_x, v_y)$ is one that satisfies the condition $SAD(v_x, v_y) \leq SAD(d_x, d_y)$ for all $(d_x, d_y) \in R$, wherein $R = \{(p,q) | p = -D_x,, \ldots, 0, \ldots, D_x \text{ and } q = -D_y,, \ldots, 0, \ldots, D_y\}$.

11. The method of claim 9, wherein the steps of determining whether the motion estimation is being performed near pattern-like objects in the frames further include the steps of:

detecting pattern-like objects in a frame utilizing horizontal and vertical projection functions $\phi_x$ and $\phi_y$, respectively, wherein:

$$\phi_x(d_x) = \sum_{q=-D_y}^{D_y} SAD(d_x, q), d_x = -D_x, \ldots, 0, \ldots, D_x, \text{ and}$$

$$\phi_y(d_y) = \sum_{p=-D_x}^{D_x} SAD(p, d_y), d_y = -D_y, \ldots, 0, \ldots, D_y.$$

12. The method of claim 11, wherein the steps of detecting pattern-like objects further include the steps of:

(a) determining values $L_x$ and $L_y$, expressed as:

$$L_x = \sum_{d_x=-D_x+1}^{D_x} |\phi(d_x) - \phi(d_x - 1)|, \text{ and}$$

$$L_y = \sum_{d_y=-D_y+1}^{D_y} |\phi(d_y) - \phi(d_y - 1)|;$$

wherein as $L_x$ increases, it is more probable that the horizontal projection function $\phi_x$ has multiple minima, and as $L_y$ increases, it is more probable that the vertical projection further $\phi_y$ has multiple minima; and (b) estimating an overall minima $L_{max}$ in the SAD as:

$L_{max} = \max(L_x, L_y)$, wherein as $L_{max}$ increases, it is more likely that the SAD may have multiple minima, indicating a pattern-like object in the frame.

13. The method of claim 12, wherein the steps of detecting pattern-like objects further include the steps of:
determining a value $\alpha$ that indicates a degree of having a pattern-like object in a frame, wherein:

$\alpha = \min(1.0, L_{mzx}/K)$, where K is a pre-determined constant.

14. The method of claim 3, wherein:
(a) the steps of finding a match further include the steps of:
comparing a block $B_t(x-d_x, y-d_y)$ in the frame $I^t$ to a block $B_{t-1}(x+d_x, y+d_y)$ in the frame $I^{t-1}$, wherein the blocks $B_t(x-d_x, y-d_y)$ and $B_{t-1}(x+d_x, y+d_y)$ are displaced by a vector $(2 \cdot d_x, 2 \cdot d_y)$;
wherein a block difference signal $D(d_x, d_y)$ is expressed as $D(d_x, d_y) = B_t(x-d_x, y-d_y) - B_{t-1}(x+d_x, y+d_y)$; and said cost function is expressed as:

$$SAD(d_x, d_y) = \|D(x, y)\|$$
$$= \sum_{i=1}^{N}\sum_{j=1}^{M} |D_{i,j}|$$

for blocks on N×M pixels; and
(b) the steps of determining said motion vector further include the steps of determining a motion vector $(v_x, v_y)$ that provides the minimum SAD, such that the motion vector $(v_x, v_y)$ is determined as one that satisfies the condition $SAD(v_x, v_y) \leq SAD(d_x, d_y)$, for one or more search locations.

15. The method of claim 14, wherein for a full search range in the motion estimation, the motion vector $(v_x, v_y)$ is one that satisfies the condition $SAD(v_x, v_y) \leq SAD(d_x, d_y)$ for all $(d_x, d_y) \in R$, wherein $R=\{(p,q)|p=-D_x,,\ldots,0,\ldots,D_x$ and $q=-D_y,,\ldots,0,\ldots,D_y\}$.

16. The method of claim 14, wherein the steps of determining whether the motion estimation is being performed near pattern-like objects in the frames comprise the steps of:
detecting pattern-like objects in a frame utilizing horizontal and vertical projection functions $\phi_x$ and $\phi_y$, respectively, wherein:

$$\phi_x(d_x) = \sum_{q=-D_y}^{D_y} SAD(d_x, q), d_x = -D_x, \ldots, 0, \ldots, D_x, \text{ and}$$

$$\phi_y(d_y) = \sum_{p=-D_x}^{D_x} SAD(p, d_y), d_y = -D_y, \ldots, 0, \ldots, D_y.$$

17. The method of claim 16, wherein the steps of detecting pattern-like objects further include the steps of:
(a) determining values $L_x$ and $L_y$, expresses as:

$$L_x = \sum_{d_x=-D_x+1}^{D_x} |\phi(d_x) - \phi(d_x - 1)|, \text{ and}$$

$$L_y = \sum_{d_y=-D_y+1}^{D_y} |\phi(d_y) - \phi(d_y - 1)|;$$

wherein as $L_x$ increases, it is more probable that the horizontal projection function $\phi_x$ has multiple minima, and as $L_y$ increases, it is more probable that the vertical projection function $\phi_y$ has multiple minima; and (b) estimating an overall minima $L_{max}$ in the SAD as:

$L_{max} = (L_x, L_y)$, wherein as $L_{max}$ increases, it is more likely than the SAD may have multiple minima, indicating a pattern-like object in the frame.

18. The method of claim 17, wherein the steps of detecting pattern-like objects further include the steps of:
determining a value $\alpha$ that indicates a degree of having a pattern-like object in a frame, wherein:

$\alpha = \min(1.0, L_{mzx}/K)$, where K is a pre-determined constant.

19. The method of claim 3, further comprising the steps of:
interpolating a frame $I^*$ based on frames $I^t$ and $I^{t-1}$ by the motion estimation, wherein the to-be-reconstructed frame $I^*$ is sequentially between the frames $I^t$ and $I^{t-1}$.

20. The method of claim 19, wherein:
a frame pixel $I^*(x, y)$ is expressed as:

$I^*(x, y) = k \cdot I^{t-1}(x+v_x, y+v_y) + (1-k) \cdot I^t(x-v_x, y-v_y)$, wherein $v_x$ and $v_y$ represent components of said motion vector, and k is a pre-determined constant between 0 and 1 associated with the relative location of the frame $I^*$ in time.

21. The method of claim 20, wherein:
the steps of determining whether the motion estimation is being performed near pattern-like objects in the frames further include the steps of determining a factor $\alpha$ that indicates a degree of having a pattern-like object in a frame; and
the steps of interpolating further include determining pixel $I^*(x, y)$ based on the factor $\alpha$ such that $I^*(x, y) = \alpha \cdot I_v + (1-\alpha) \cdot I_0$;

where $I_v = k \cdot I^{t-1}(x+v_x, y+v_y) + (1-k) \cdot I^t(x-v_x, y-v_y)$, and $$I_0 = k \cdot I^{t-1}(x, y) + (1-k) \cdot I^t(x, y).$$

22. The method of claim 1, further comprising the steps of:
   interpolating a new frame as a function of the two existing frames based on the motion vector and a degree of having a pattern-like object in a frame.

23. A motion compensation method for interpolating a new frame based on two existing image frames, comprising the steps of:
   dividing each existing frame into a number of blocks, wherein at a time t, $I^t$ denotes the $t^{th}$ existing frame, $I^t(x, y)$ denotes a pixel value at location (x, y) in the frame $I^t$, and $B_t(x, y)$ denotes the block at location (x, y) in $I^t$;
   finding a match for a block of one frame within a search area in another frame by comparing a block $B_t(x_1, y_1)$ in $I^t$ and another block $B_{t-1}(x_2, y_2)$ in $I^{t-1}$ using a cost function that is a measure of the mismatch between the two matched blocks;
   determining a motion vector representing a geometrical displacement between the two matched blocks, by determining whether a motion estimation is being performed near pattern-like objects in the frames; and
   interpolating a new frame I* based on the existing frames $I^t$ and $I^{t-1}$, wherein a frame pixel I*(x, y) is expressed as:

$$I^*(x, y) = k \cdot I^{t-1}(x+v_x, y+v_y) + (1-k) \cdot I^t(x-v_x, y-v_y),$$

where $v_x$ and $v_y$ represent components of said motion vector, and k is a pre-determined constant between 0 and 1 associated with a relative location of the frame I* in time.

24. The method of claim 23, wherein:
   the steps of determining whether motion estimation is being performed near pattern-like objects in the frames further include the steps of determining a factor α that indicates a degree of having a pattern-like object in a frame; and
   the steps of interpolating further include determining pixel I*(x, y) based on the factor α such that $$I^*(x, y) = \alpha \cdot I_v + (1-\alpha) \cdot I_0;$$

where $$I_v = k \cdot I^{t-1}(x+v_x, y+v_y) + (1-k) \cdot I^t(x-v_x, y-v_y),$$

and $$I_0 = k \cdot I^{t-1}(x, y) + (1-k) \cdot I^t(x, y).$$

25. A motion compensation encoding apparatus for use in an image encoder, comprising:
   a motion estimator that estimates a motion between one image frame and another image frame by finding a match for a block of one frame within a search area in the other frame; and
   a pattern detector that determines whether a motion estimation is being performed near pattern-like objects in the frames.

26. The apparatus of claim 25, further comprising:
   a motion vector generation that determines a motion vector representing a geometrical displacement between the two matched blocks.

27. The apparatus of claim 26, wherein:
   at a time t, $I^t$ denotes the $t^{th}$ frame, $I^t(x, y)$ denotes the pixel value at location (x, y) in the frame $I^t$, and $B_t(x, y)$ denotes the block at location (x, y) in the $t^{th}$ frame; and
   the motion estimator finds a match by comparing one block $B_t(x_1, y_1)$ in $I^t$ and another block $B_{t-1}(x_2, y_2)$ in $I^{t-1}$ using a cost function that is a measure of the mismatch between the two matched blocks.

28. The apparatus of claim 27, wherein:
   the motion estimator compares the block $B_t(x, y)$ in the frame $I^t$ with a block $B_{t-1}(x+d_x, y+d_y)$ in the frame $I^{t-1}$, wherein the blocks $B_t(x, y)$ and $B_{t-1}(x+d_x, y+d_y)$ are displaced by a vector $(d_x, d_y)$, and $(d_x, d_y)$ represents the search locations satisfying $(d_x, d_y) \in \{(p,q) | p = -D_x, \ldots, 0, \ldots, D_x \text{ and } q = -D_y, \ldots, 0, \ldots, D_y\}$, such that $D_x$ and $D_y$ are difference signals associated with the search area;
   said cost function comprises a sum of absolute difference (SAD) function;

$$SAD(d_x, d_y) = \|D(x, y)\|$$

$$= \sum_{i=1}^{N} \sum_{j=1}^{M} |D_{i,j}|,$$

for a block of N×M pixels;
where:

$$D(d_x, d_y) = B_t(x, y) - B_{t-1}(x+d_x, y+d_y);$$

$$D(d_x, d_y) = \begin{bmatrix} D_{1,1} & D_{1,2} & \cdots & D_{1,M} \\ D_{2,1} & D_{2,2} & \cdots & D_{2,M} \\ \vdots & \vdots & & \vdots \\ D_{N,1} & D_{N,1} & \cdots & D_{N,M} \end{bmatrix}; \text{ and}$$

the motion vector generator determines a motion vector $(v_x, v_y)$ that provides a minimum SAD, wherein the motion vector $(v_x, v_y)$ satisfies the condition $SAD(v_x, v_y) \leq SAD(d_x, d_y)$, for one or more search locations of $(d_x, d_y)$ in a search range.

29. The apparatus of claim 28, wherein for a full search range, the motion vector $(v_x, v_y)$ is one that satisfies the condition $SAD(v_x, v_y) \leq SAD(d_x, d_y)$ for all $(d_x, d_y) \in R$, wherein $R = \{(p,q) | p = -D_x, \ldots, 0, \ldots, D_x \text{ and } q = -D_y, \ldots, 0, \ldots, D_y\}$, which represents a set of search locations.

30. The apparatus of claim 28, wherein the pattern detector further includes a projection function block that generates horizontal and vertical projection functions $\phi_x$ and $\phi_y$, respectively, wherein:

$$\phi_x(d_x) = \sum_{q=-D_y}^{D_y} SAD(d_x, q), d_x = -D_x, \ldots, 0, \ldots, D_x, \text{ and}$$

$$\phi_y(d_y) = \sum_{p=-D_x}^{D_x} SAD(p, d_y), d_y = -D_y, \ldots, 0, \ldots, D_y.$$

31. The apparatus of claim 30, wherein the pattern detector further includes:

a minima function block that determines values $L_x$ and $L_y$, wherein:

$$L_x = \sum_{d_x=-D_x+1}^{D_x} |\phi(d_x) - \phi(d_x - 1)|, \text{ and}$$

$$L_y = \sum_{d_y=-D_y+1}^{D_y} |\phi(d_y) - \phi(d_y - 1)|;$$

such that as $L_x$ increases, it is more probable that the horizontal projection function $\phi_x$ has multiple minima, and as $L_y$ increases, it is more probable that the vertical projection function $\phi_y$ has multiple minima; and and a minima estimator that estimates an overall minima $L_{max}$ in the SAD, as:

$$L_{max} = (L_x, L_y),$$

wherein as $L_{max}$ increases, it is more likely that the SAD may have multiple minima, indicating a pattern-like object in the frame.

32. The apparatus of claim 31, wherein the pattern detector further determines a value $\alpha$ that indicates a degree of having a pattern-like object in a frame, wherein:

$$\alpha = \min(1.0, L_{max}/K),$$

where K is a pre-determined constant.

33. The apparatus of claim 27, wherein:

the motion estimator finds a match by comparing a block $B_{t-1}(x, y)$ in the frame $I^{t-1}$ to a block $B_t(x+d_x, y+d_y)$ in the frame $I^t$, such that the blocks $B_{t-1}(x, y)$ and $B_t(x+d_x, y+d_y)$ are displaced by the vector $(d_x, d_y)$; where a block difference signal $D(d_x, d_y)$ is expressed as:

$$D(d_x, d_y) = B_{t-1}(x, y) - B_t(x+d_x, y+d_y), \text{ and}$$

said cost function is expressed as:

$$SAD(d_x, d_y) = \|D(x, y)\|$$
$$= \sum_{i=1}^{N} \sum_{j=1}^{M} |D_{i,j}|$$

for blocks on N×M pixels; and the motion vector generator determines a motion vector $(v_x, v_y)$, which provides the minimum SAD, and is determined as one that satisfies the condition $SAD(v_x, v_y) \leq SAD(d_x, d_y)$, for one or more search locations of $(d_x, d_y)$ in a search range.

34. The apparatus of claim 33, wherein for a full search range in the motion estimation, the motion vector $(v_x, v_y)$ is one that satisfies the condition $SAD(v_x, v_y) \leq SAD(d_x, d_y)$ for all $(d_x, d_y) \in R$, wherein $R = \{(p,q)|p=-D_x,\ldots,0,\ldots,D_x \text{ and } q=-D_y,\ldots,0,\ldots,D_y\}$.

35. The apparatus of claim 33, wherein the pattern detector further includes:

a projection function block that utilizes horizontal and vertical projection functions $\phi_x$ and $\phi_y$, respectively, wherein:

$$\phi_x(d_x) = \sum_{q=-D_y}^{D_y} SAD(d_x, q), d_x = -D_x, \ldots, 0, \ldots, D_x, \text{ and}$$

$$\phi_y(d_y) = \sum_{p=-D_x}^{D_x} SAD(p, d_y), d_y = -D_y, \ldots, 0, \ldots, D_y.$$

36. The apparatus of claim 35, wherein the pattern detector further includes:

a minima function block that determines values $L_x$ and $L_y$, expressed as:

$$L_x = \sum_{d_x=-D_x+1}^{D_x} |\phi(d_x) - \phi(d_x - 1)|, \text{ and}$$

$$L_y = \sum_{d_y=-D_y+1}^{D_y} |\phi(d_y) - \phi(d_y - 1)|;$$

wherein as $L_x$ increases, it is more probable that the horizontal projection function $\phi_x$ has multiple minima, and as $L_y$ increases, it is more probable that the vertical projection function $\phi_y$ has multiple minima; and a minima estimator that estimates an overall minima $L_{max}$ in the SAD as:

$$L_{max} = \max(L_x, L_y),$$

wherein as $L_{max}$ increases, it is more likely that the SAD may have multiple minima, indicating a pattern-like object in the frame.

37. The apparatus of claim 36, wherein the pattern detector further determines a value $\alpha$ that indicates a degree of having a pattern-like object in a frame, wherein:

$$\alpha = \min(1.0, L_{max}/K),$$

where K is a pre-determined constant.

38. The apparatus of claim 27, wherein:

the motion estimator finds a match by comparing a block $B_t(x-d_x, y-d_y)$ in the frame $I^t$ to a block $B_{t-1}(x+d_x, y+d_y)$ in the frame $I^{t-1}$, wherein the blocks $B_t(x-d_x, y-d_y)$ and $B_{t-1}(x+d_x, y+d_y)$ are displaced by a vector $(2 \cdot d_x, 2 \cdot d_y)$;

wherein a block difference signal $D(d_x, d_y)$ is expressed as:

$$D(d_x, d_y) = B_t(x-d_x, y-d_y) - B_{t-1}(x+d_x, y+d_y); \text{ and}$$

said cost function is expressed as:

$$SAD(d_x, d_y) = \|D(x, y)\|$$
$$= \sum_{i=1}^{N} \sum_{j=1}^{M} |D_{i,j}|$$

for blocks on N×M pixels; and the motion vector generator further determines a motion vector $(v_x, v_y)$ that provides the minimum SAD, such that the motion vector $(v_x, v_y)$ is determined as one that satisfies the condition $SAD(v_x, v_y) \leq SAD(d_x, d_y)$, for one or more search locations.

39. The apparatus of claim 38, wherein for a full search range in the motion estimation, the motion vector $(v_x, v_y)$ is one that satisfies the condition $SAD(v_x, v_y) \leq SAD(d_x, d_y)$ for all $(d_x, d_y) \in R$, wherein $R=\{(p,q)|p=-D_x,, \ldots, 0, \ldots, D_x$ and $q=-D_y,, \ldots, 0, \ldots, D_y\}$.

40. The apparatus of claim 38, wherein the pattern detector further includes a projection function block that utilizes horizontal and vertical projection functions $\phi_x$ and $\phi_y$, respectively, wherein:

$$\phi_x(d_x) = \sum_{q=-D_y}^{D_y} SAD(d_x, q), d_x = -D_x, \ldots, 0, \ldots, D_x, \text{ and}$$

$$\phi_y(d_y) = \sum_{p=-D_x}^{D_x} SAD(p, d_y), d_y = -D_y, \ldots, 0, \ldots, D_y.$$

41. The apparatus of claim 40, wherein:
the pattern detector further includes a minima function block that determines values $L_x$ and $L_y$, expresses as:

$$L_x = \sum_{d_x=-D_x+1}^{D_x} |\phi(d_x) - \phi(d_x - 1)|, \text{ and}$$

$$L_y = \sum_{d_y=-D_y+1}^{D_y} |\phi(d_y) - \phi(d_y - 1)|;$$

wherein as $L_x$ increases, it is more probable that the horizontal projection function $\phi_x$ has multiple minima, and as $L_y$ increases, it is more probable that the vertical projection function $\phi_y$ has multiple minima; and a minima estimator that estimates an overall minima $L_{max}$ in the SAD as:

$L_{max} = \max(L_x, L_y)$, wherein as $L_{max}$ increases, it is more likely that the SAD may have multiple minima, indicating a pattern-like object in the frame.

42. The apparatus of claim 41, wherein the pattern detector further determines a value $\alpha$ that indicates a degree of having a pattern-like object in a frame, wherein:

$\alpha = \min(1.0, L_{max}/K)$, where K is a pre-determined constant.

43. The apparatus of claim 27, further comprising:
an interpolator that interpolates a frame I* based on frames $I^t$ and $I^{t-1}$, wherein the to-be-reconstructed frame I* is sequentially between the frames $I^t$ and $I^{t-1}$.

44. The apparatus of claim 43, wherein:
a frame pixel I*(x, y) is expressed as:

$I^*(x, y) = k \cdot I^{t-1}(x+v_x, y+v_y) + (1-k) \cdot I^t(x-v_x, y-v_y)$, wherein $v_x$ and $v_y$ represent components of said motion vector, and k is a pre-determined constant between 0 and 1 associated with a relative location of the frame I* in time.

45. The apparatus of claim 44, wherein:
the pattern detector further determines a factor $\alpha$ that indicates a degree of having a pattern-like object in a frame; and the interpolator further determines pixel I*(x, y) based on the factor $\alpha$ such that $I^*(x, y) = \alpha \cdot I_v + (1-\alpha) \cdot I_0$;

where $I_v = k \cdot I^{t-1}(x+v_x, y+v_y) + (1-k) \cdot I^t(x-v_x, y-v_y)$, and $I_0 = k \cdot I^{t-1}(x, y) + (1-k) \cdot I^t(x, y)$.

46. The apparatus of claim 25, further comprising:
an interpolator that interpolates a new frame as a function of the two existing frames based on the motion vector and a degree of having a pattern-like object in a frame.

47. A motion compensation apparatus for use in an image encoder, comprising:
a motion estimator that estimates a motion between one image frame and another image frame by finding a match for a block of one frame within a search area in another frame; and a pattern detector that determines whether the motion estimation is being performed near pattern-like objects in the frames.

48. A motion compensation encoding apparatus for use in an image encoder having a memory that maintains existing frames including a number of blocks, wherein at a time t, $I^t$ denotes the $t^{th}$ existing frame, $I^t(x, y)$ denotes the pixel value at location (x, y) in the frame $I^t$, and $B_t(x, y)$ denotes the block at location (x, y) in the $t^{th}$ frame, the apparatus comprising:
a motion estimator that finds a match for a block of one frame within a search area in another frame by comparing a block $B_t(x_1, y_1)$ in $I^t$ and another block $B_{t-1}(x_2, y_2)$ in $I^{t-1}$ using a cost function that is a measure of a mismatch between the two matched blocks;

a motion vector generator that generates a motion vector representing a geometrical displacement between the two matched blocks;

a pattern detector that determines whether a motion estimation is being performed near pattern-like objects in the frames; and an interpolator that interpolates a new frame I* based on the existing frames $I^t$ and $I^{t-1}$, wherein a frame pixel I*(x, y) is expressed as:

$I^*(x, y) = k \cdot I^{t-1}(x+v_x, y+v_y) + (1-k) \cdot I^t(x-v_x, y-v_y)$, where $v_x$ and $v_y$ represent components of said motion vector, and k is a pre-determined constant between 0 and 1 associated with a relative location of the frame I* in time.

49. The apparatus of claim 48, wherein:
the pattern detector further determines a factor $\alpha$ that indicates a degree of having a pattern-like object in a frame; and the interpolator further determines a pixel I*(x, y) based on the factor $\alpha$ such that $I^*(x, y) = \alpha \cdot I_v + (1-\alpha) \cdot I_0$;

where $I_v = k \cdot I^{t-1}(x+v_x, y+v_y) + (1-k) \cdot I^t(x-v_x, y-v_y)$, and $I_0 = k \cdot I^{t-1}(x, y) + (1-k) \cdot I^t(x, y)$.

* * * * *